(12) United States Patent
Sugiyama (10) Patent No.: US 10,894,230 B2
(45) Date of Patent: Jan. 19, 2021

(54) CO2 SEPARATION SYSTEM FOR INSTALLATION IN VEHICLE USING INTERNAL COMBUSTION ENGINE AS POWER SOURCE

(71) Applicant: TOYOTA JIDOSHA KABUSHIKI KAISHA, Toyota (JP)

(72) Inventor: Kouseki Sugiyama, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 45 days.

(21) Appl. No.: 16/390,032

(22) Filed: Apr. 22, 2019

(65) Prior Publication Data

US 2019/0388830 A1   Dec. 26, 2019

(30) Foreign Application Priority Data

Jun. 20, 2018 (JP) ................................. 2018-117315

(51) Int. Cl.
*F01N 3/08* (2006.01)
*B01D 53/22* (2006.01)

(52) U.S. Cl.
CPC ......... *B01D 53/229* (2013.01); *B01D 53/226* (2013.01); *F01N 3/0857* (2013.01);
(Continued)

(58) Field of Classification Search
CPC ................ B01D 53/229; B01D 53/226; B01D 2053/221; B01D 2258/01;
(Continued)

(56) References Cited

U.S. PATENT DOCUMENTS

2012/0272657 A1* 11/2012 Baker .................... B01D 53/22
60/772
2016/0369674 A1* 12/2016 Younes ................ B01D 53/002
2017/0183996 A1*  6/2017 Baker .................... B01D 53/22

FOREIGN PATENT DOCUMENTS

JP         2015-502474 A    1/2015
JP         2015-510991 A    4/2015
(Continued)

*Primary Examiner* — Matthew T Largi
(74) *Attorney, Agent, or Firm* — Oliff PLC (57) ABSTRACT

The $CO_2$ separation system performs, when the internal combustion engine is operating and the vehicle is travelling, a first mode wherein exhaust gas generated by the internal combustion engine is introduced to a $CO_2$ supply side of a first $CO_2$ separation device via a first $CO_2$ supply side introduction flow path, and air from outside the vehicle is introduced to a $CO_2$ permeation side of the first $CO_2$ separation device via a first $CO_2$ permeation side introduction flow path using travelling wind, whereby $CO_2$ in the exhaust gas selectively permeates from the $CO_2$ supply side to the $CO_2$ permeation side of the first $CO_2$ separation device through a $CO_2$ permeable membrane of the first $CO_2$ separation device using a difference in $CO_2$ partial pressure between the $CO_2$ supply side and the $CO_2$ permeation side of the first $CO_2$ separation device as a driving force.

4 Claims, 5 Drawing Sheets

(52) U.S. Cl.
CPC ..... *B01D 2053/221* (2013.01); *B60Y 2200/92* (2013.01); *F01N 2570/10* (2013.01)

(58) Field of Classification Search
CPC ...... B01D 2259/4566; B01D 2257/504; B01D 53/227; B01D 53/22; B01D 53/62; B01D 53/92; F01N 3/0857; F01N 2570/10; F01N 2240/26; F01N 3/30; F01N 3/08; F01N 13/00; B60Y 2200/92; Y02T 10/20; Y02C 10/10; Y02C 10/04
See application file for complete search history.

(56) References Cited

FOREIGN PATENT DOCUMENTS

| | | |
|---|---|---|
| WO | 2013/063052 A1 | 5/2013 |
| WO | 2013/142469 A1 | 9/2013 |

* cited by examiner

CO2 SEPARATION SYSTEM FOR INSTALLATION IN VEHICLE USING INTERNAL COMBUSTION ENGINE AS POWER SOURCE

FIELD

The present invention relates to a $CO_2$ separation system for installation in a vehicle which uses an internal combustion engine as a power source.

BACKGROUND

It is known that the exhaust gasses of vehicles including internal combustion engines include components such as $NO_x$, CO, and CH. These components are conventionally converted to $N_2$, $CO_2$, $H_2O$, etc., by an exhaust gas purification catalyst to purify the exhaust gas generated by the internal combustion engine and are discharged to the outside of the vehicle.

Among the gasses discharged to the outside of the vehicle, $CO_2$ is believed to contribute to the greenhouse effect, and reduction of the discharge amount thereof has been demanded.

Patent Literature 1 discloses capturing $CO_2$ from the exhaust flow of an internal combustion engine and temporarily compressing the $CO_2$ to increase the density thereof until it is discharged at a collection station during refueling of the vehicle.

Furthermore, Patent Literature 2 discloses reducing the $CO_2$ discharge of a vehicle by separating water and $CO_2$ from exhaust gas with a membrane separator and converting the $CO_2$ into a hydrocarbon fuel.

CITATION LIST

Patent Literature

[PTL 1] Japanese Unexamined Patent Publication (Kohyo) No. 2015-510991
[PTL 2] Japanese Unexamined Patent Publication (Kohyo) No. 2015-502474

SUMMARY

Technical Problem

From the viewpoint of reducing the $CO_2$ discharge of a vehicle, in vehicles using an internal combustion engine as a power source, it is desired to efficiently separate $CO_2$ in exhaust gas and recover the $CO_2$.

Furthermore, in general, it is believed that the concentration of $CO_2$ in the atmosphere around highly-trafficked roadways is higher than the atmosphere in other areas. Thus, if $CO_2$ in the atmosphere around these roadways can be reduced, environmental impact can be further reduced.

The present disclosure provides a $CO_2$ separation system which can efficiently separate $CO_2$ in the exhaust gas of vehicles using an internal combustion engine as a power source and $CO_2$ in the atmosphere around roadways.

Solution to Problem

The present inventors have discovered that the above problems can be solved by the following means:

<Aspect 1>

A $CO_2$ separation system for installation in a vehicle using an internal combustion engine as a power source, wherein the system comprises:
the internal combustion engine,
a first $CO_2$ separation device comprising a $CO_2$ permeable membrane separating a $CO_2$ supply side and a $CO_2$ permeation side,
a first $CO_2$ supply side introduction flow path for introducing exhaust gas generated by the internal combustion engine to the $CO_2$ supply side of the first $CO_2$ separation device, and
a first $CO_2$ permeation side introduction flow path for introducing air from outside the vehicle to the $CO_2$ permeation side of the first $CO_2$ separation device; and wherein the system:
(A) performs, when the internal combustion engine is operating and the vehicle is travelling, a first mode wherein exhaust gas generated by the internal combustion engine is introduced to the $CO_2$ supply side of the first $CO_2$ separation device via the first $CO_2$ supply side introduction flow path, and air from outside the vehicle is introduced to the $CO_2$ permeation side of the first $CO_2$ separation device via the first $CO_2$ permeation side introduction flow path using travelling wind, whereby $CO_2$ in the exhaust gas selectively permeates from the $CO_2$ supply side to the $CO_2$ permeation side of the first $CO_2$ separation device through the $CO_2$ permeable membrane of the first $CO_2$ separation device, using a difference in $CO_2$ partial pressure between the $CO_2$ supply side and the $CO_2$ permeation side of the first $CO_2$ separation device as a driving force.

<Aspect 2>

The system according to aspect 1, wherein the system further comprises:
a first decompression device for decompressing the $CO_2$ permeation side of the first $CO_2$ separation device; and wherein the system:
(B) performs, when the internal combustion engine is operating and the vehicle is stopped, a second mode wherein exhaust gas generated by the internal combustion engine is introduced to the $CO_2$ supply side of the first $CO_2$ separation device via the first $CO_2$ supply side introduction flow path and the $CO_2$ permeation side of the first $CO_2$ separation device is decompressed by the first decompression device, whereby $CO_2$ in the exhaust gas selectively permeates from the $CO_2$ supply side to the $CO_2$ permeation side of the first $CO_2$ separation device through the $CO_2$ permeable membrane of the first $CO_2$ separation device, using a difference in $CO_2$ partial pressure between the $CO_2$ supply side and the $CO_2$ permeation side of the first $CO_2$ separation device as a driving force.

<Aspect 3>

The system according to aspect 1 or 2, wherein the system further comprises:
a second $CO_2$ separation device comprising a $CO_2$ permeable membrane for separating a $CO_2$ supply side and a $CO_2$ permeation side,
a second $CO_2$ supply side introduction flow path for introducing air from outside the vehicle to the $CO_2$ supply side of the second $CO_2$ separation device, and
a second decompression device for decompressing the $CO_2$ permeation side of the second $CO_2$ separation device,
wherein the system:
(C) performs, when the internal combustion engine is stopped, a third mode wherein air from outside the vehicle is introduced to the $CO_2$ supply side of the second $CO_2$ separation device via the second $CO_2$ supply side introduction flow path, and the $CO_2$ permeation side of the second $CO_2$ separation device is decompressed by the second decompression device, whereby $CO_2$ in the air selectively permeates from the $CO_2$ supply side to the $CO_2$ permeation side of the second $CO_2$ separation device through the $CO_2$ permeable membrane of the second $CO_2$ separation device using a difference in $CO_2$ partial pressure between the $CO_2$ supply side and the $CO_2$ permeation side of the second $CO_2$ separation device as a drive force.

<Aspect 4>

The system according to aspect 1, wherein the system further comprises:

a first decompression device for decompressing the $CO_2$ permeation side of the first $CO_2$ separation device, a second $CO_2$ separation device comprising a $CO_2$ permeable membrane for separating a $CO_2$ supply side and a $CO_2$ permeation side, a second $CO_2$ supply side introduction flow path for introducing air from outside the vehicle to the $CO_2$ supply side of the second $CO_2$ separation device, and a second decompression device for decompressing the $CO_2$ permeation side of the second $CO_2$ separation device, wherein the system:

(B) performs, when the internal combustion engine is operating and the vehicle is stopped, a second mode wherein exhaust gas generated by the internal combustion engine is introduced to the $CO_2$ supply side of the first $CO_2$ separation device via the first $CO_2$ supply side introduction flow path and the $CO_2$ permeation side of the first $CO_2$ separation device is decompressed by the first decompression device, whereby, $CO_2$ in the exhaust gas selectively permeates from the $CO_2$ supply side to the $CO_2$ permeation side of the first $CO_2$ separation device through the $CO_2$ permeable membrane of the first $CO_2$ separation device using a difference in $CO_2$ partial pressure between the $CO_2$ supply side and the $CO_2$ permeation side of the first $CO_2$ separation device as a driving force, and (C) performs, when the internal combustion engine is stopped, a third mode wherein air from outside the vehicle is introduced to the $CO_2$ supply side of the second $CO_2$ separation device via the second $CO_2$ supply side introduction flow path, and the $CO_2$ permeation side of the second $CO_2$ separation device is decompressed by the second decompression device, whereby, $CO_2$ in the air selectively permeates from the $CO_2$ supply side to the $CO_2$ permeation side of the second $CO_2$ separation device through the $CO_2$ permeable membrane of the second $CO_2$ separation device using a difference in $CO_2$ partial pressure between the $CO_2$ supply side and the $CO_2$ permeation side of the second $CO_2$ separation device as a drive force.

<Aspect 5>

The system according to aspect 4, wherein the first $CO_2$ separation device and the second $CO_2$ separation device are identical, wherein the first $CO_2$ supply side introduction flow path and the second $CO_2$ supply side introduction flow path are identical, and wherein the first decompression device and the second decompression device are identical.

<Aspect 6>

The system according to any one of aspects 1 to 5, wherein the vehicle is a hybrid vehicle further comprising an electric motor, wherein at least one of the internal combustion engine and the electric motor is switched on and used as a power source.

Advantageous Effects of Invention

According to the present disclosure, a $CO_2$ separation system which can efficiently separate $CO_2$ in the exhaust gas of a vehicle using an internal combustion engine as a power source can be provided.

DESCRIPTION OF EMBODIMENTS

The embodiments of the present disclosure will be described in detail below. Note that the present disclosure is not limited to the following embodiments. Various modifications can be made within the scope of the gist of the present disclosure.

<<$CO_2$ Separation System>>

The $CO_2$ separation system of the present disclosure is a $CO_2$ separation system for installation in a vehicle using an internal combustion engine as a power source. The $CO_2$ separation system of the present disclosure comprises an internal combustion engine, a first $CO_2$ separation device including a $CO_2$ permeable membrane separating a $CO_2$ supply side and a $CO_2$ permeation side, a first $CO_2$ supply side introduction flow path for introducing exhaust gas generated by the internal combustion engine to the $CO_2$ supply side of the first $CO_2$ separation device, and a first $CO_2$ permeation side introduction flow path for introducing air from outside the vehicle to the $CO_2$ permeation side of the first $CO_2$ separation device.

The $CO_2$ separation system of the present disclosure:

(A) performs, when the internal combustion engine is operating and the vehicle is travelling, a first mode wherein exhaust gas generated by the internal combustion engine is introduced to the $CO_2$ supply side of the first $CO_2$ separation device via the first $CO_2$ supply side introduction flow path, and air from outside the vehicle is introduced to the $CO_2$ permeation side of the first $CO_2$ separation device via the first $CO_2$ permeation side introduction flow path using travelling wind, whereby $CO_2$ in the exhaust gas selectively permeates from the $CO_2$ supply side to the $CO_2$ permeation side of the first $CO_2$ separation device through the $CO_2$ permeable membrane of the first $CO_2$ separation device using a difference in $CO_2$ partial pressure between the $CO_2$ supply side and the $CO_2$ permeation side of the first $CO_2$ separation device as a driving force.

Note that in the present description, "travelling wind" means an air flow occurring relatively between the vehicle and the outside of the vehicle when the vehicle is travelling.

The $CO_2$ separated by the $CO_2$ separation system of the present disclosure can be decomposed using, for example, a plasma and discharged as C and $O_2$.

Separated $CO_2$ can also be recovered and used as a material for synthesizing hydrocarbons. The synthesized hydrocarbons can be reused as fuel for internal combustion engines. As a method of synthesizing hydrocarbons from $CO_2$, for example, a method of synthesizing hydrocarbons using $H_2$ produced by electrolyzing water in exhaust gas, or a method of introducing $CO_2$ together with a reactor into water to produce hydrocarbons by artificial photosynthesis can be used.

<First Mode>

The $CO_2$ separation system of the present disclosure (A) performs the above first mode when the internal combustion engine is operating and the vehicle is travelling.

Figure 1:
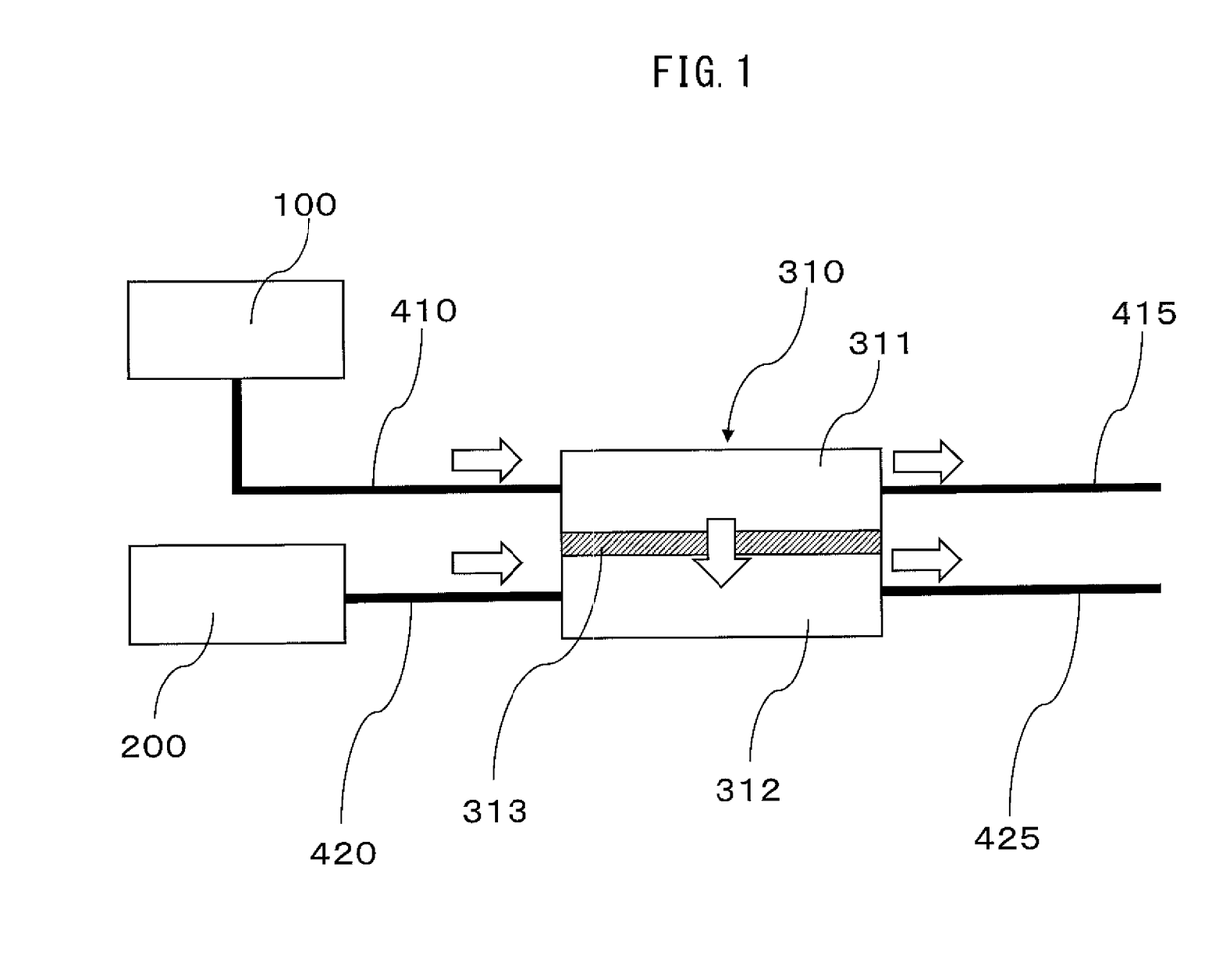
FIG. 1 is a schematic view of an example of a portion of the $CO_2$ separation system of the present disclosure performing a first mode.

FIG. 1 is a schematic view of an example of a portion of the $CO_2$ separation system of the present disclosure performing the first mode. Though not explicitly shown in FIG. 1, the internal combustion engine is operating and the vehicle is travelling.

In FIG. 1, the exhaust gas discharged from the internal combustion engine 100 is introduced to the $CO_2$ supply side 311 of the first $CO_2$ separation device 310 via a first $CO_2$ supply side introduction flow path 410, as indicated by the arrow. Furthermore, air from outside 200 of the vehicle, powered by travelling wind, is supplied to the $CO_2$ permeation side 312 of the first $CO_2$ separation device 310 via the first $CO_2$ permeation side introduction flow path 420, as indicated by the arrow. As a result, exhaust gas is present on the $CO_2$ supply side 311 of the first $CO_2$ separation device 310 and air is present on the $CO_2$ permeation side 312.

The partial pressure of the $CO_2$ in the exhaust gas is higher than the partial pressure of the $CO_2$ in the air. Further, due to Bernoulli's theorem, the static pressure of $CO_2$ is reduced on the $CO_2$ permeation side by the traveling wind, and thus, there is a difference in $CO_2$ partial pressure between the $CO_2$ supply side and $CO_2$ permeation side of the first $CO_2$ separation device 310.

Using this difference in $CO_2$ partial pressure as a driving force, $CO_2$ in the exhaust gas 10 permeates from the $CO_2$ supply side 311 to the $CO_2$ permeation side 312 via the $CO_2$ permeable membrane 313, as indicated by the arrow.

The $CO_2$ which permeates to the $CO_2$ permeation side 312 is discharged to the outside of the first $CO_2$ separation device 310 along with air via the first $CO_2$ permeation side discharge flow path 425, as indicated by the arrow. Furthermore, the remaining components of the exhaust gas introduced to the $CO_2$ supply side 311 of the first $CO_2$ separation device 310 flow along the first $CO_2$ supply side discharge flow path 415 and are discharged to the outside of the first $CO_2$ separation device 310, as indicated by the arrow.

Note that FIG. 1 is not intended to limit the $CO_2$ separation system of the present invention to an aspect including a first $CO_2$ supply side discharge flow path 415 and a first $CO_2$ permeation side discharge flow path 425.

Thus, in the first mode, $CO_2$ on the $CO_2$ permeation side can be more efficiently separated using the difference in $CO_2$ partial pressure between the $CO_2$ supply side and the $CO_2$ permeation side of the first $CO_2$ separation device.

<Second Mode and Third Mode>

The $CO_2$ separation system of the present disclosure can further perform the following second mode and third mode depending on the state of the vehicle.

(Second Mode)

The $CO_2$ separation system of the present disclosure (B) may perform the second mode when the internal combustion engine is operating and the vehicle is stopped. When the $CO_2$ separation system of the present disclosure performs the second mode, the $CO_2$ separation system of the present disclosure further includes a first decompression device.

In the second mode, exhaust gas generated by the internal combustion engine is introduced to the $CO_2$ supply side of the first $CO_2$ separation device via the first $CO_2$ supply side introduction flow path and the $CO_2$ permeation side of the first $CO_2$ separation device is decompressed by the first decompression device, whereby $CO_2$ in the exhaust gas selectively permeates from the $CO_2$ supply side to the $CO_2$ permeation side of the first $CO_2$ separation device through the $CO_2$ permeable membrane of the first $CO_2$ separation device using the difference in $CO_2$ partial pressure between the $CO_2$ supply side and the $CO_2$ permeation side of the first $CO_2$ separation device as a driving force.

Figure 2:
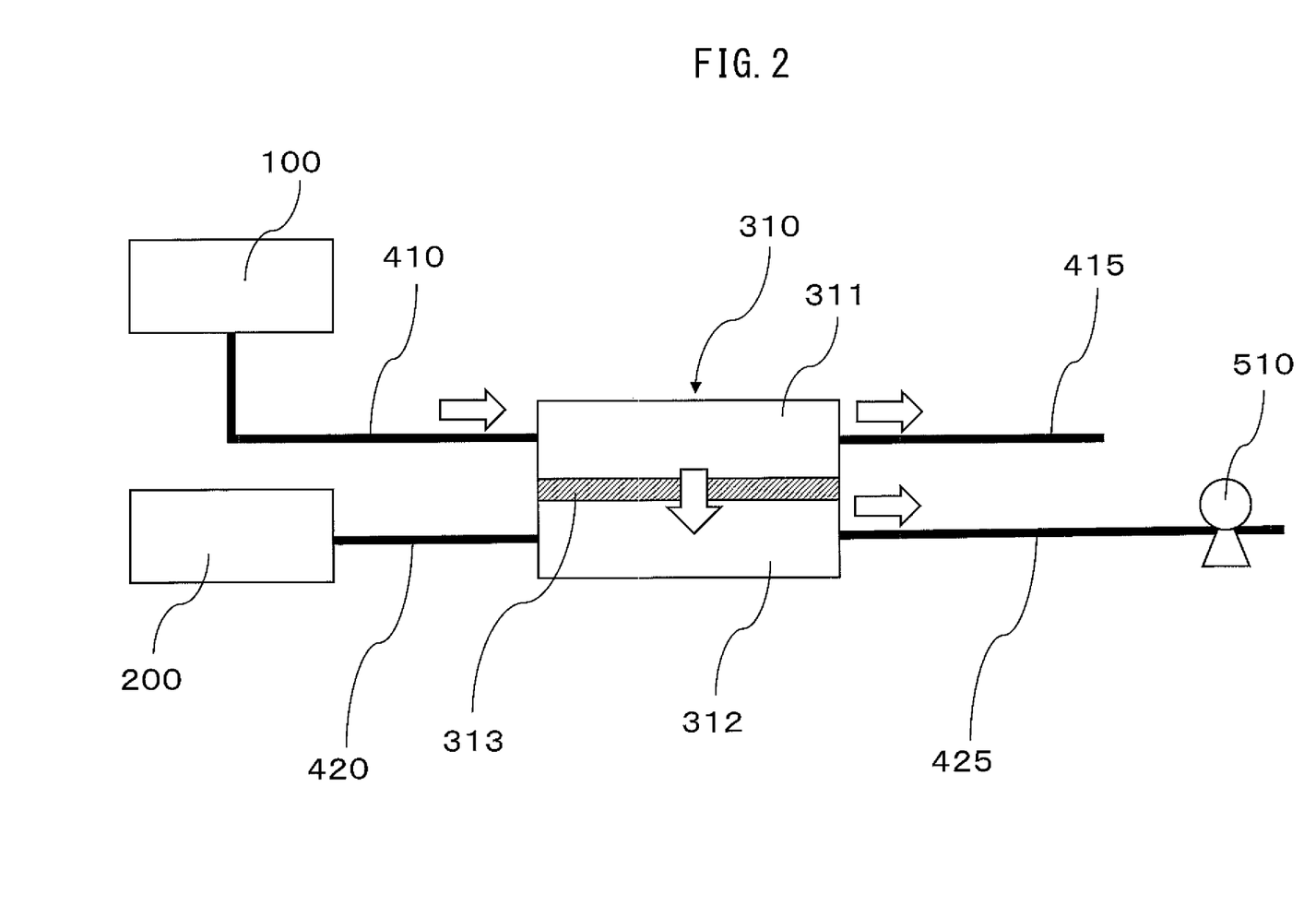
FIG. 2 is a schematic view of an example of a portion of the $CO_2$ separation system of the present disclosure performing a second mode.

FIG. 2 is a schematic view of an example of a portion of the $CO_2$ separation system of the present disclosure performing the second mode. Though not explicitly shown in FIG. 2, the internal combustion engine is operating and the vehicle is stopped.

In FIG. 2, exhaust gas discharged from the internal combustion engine 100 is introduced to the $CO_2$ supply side 311 of the first $CO_2$ separation device 300, as indicated by the arrow. Furthermore, the $CO_2$ permeation side 312 of the first $CO_2$ separation device 310 is decompressed by the first decompression device 510. As a result, a difference in $CO_2$ partial pressure is generated between the $CO_2$ supply side 311 and the $CO_2$ permeation side 312.

Using this difference in partial pressure as a driving force, $CO_2$ in the exhaust gas permeates from the $CO_2$ supply side 311 to the $CO_2$ permeation side 312 via the $CO_2$ permeable membrane 313, as indicated by the arrow.

Since the $CO_2$ permeation side 312 is decompressed by the first decompression device 510 arranged in the first $CO_2$ permeation side discharge flow path 425, the $CO_2$ which has permeated to the $CO_2$ permeation side 312 can be efficiently discharged to the outside of the first $CO_2$ separation device 310 via the first $CO_2$ permeation side discharge flow path 425, as indicated by the arrow. Furthermore, the remaining components of the exhaust gas introduced to the $CO_2$ supply side 311 of the first $CO_2$ separation device 310 are discharged to the outside of the first $CO_2$ separation device 310 via the first $CO_2$ supply side discharge flow path 415, as indicated by the arrow.

Note that FIG. 2 is not intended to limit the $CO_2$ separation system of the present disclosure to an aspect including the first $CO_2$ supply side discharge flow path 415 and the first $CO_2$ permeation side discharge flow path 425. Furthermore, FIG. 2 is not intended to limit the $CO_2$ separation system of the present disclosure to an aspect in which the power for discharging the $CO_2$ to the outside of the first $CO_2$ separation device 310 is imparted by the first decompression device 510.

Thus, in the second mode, $CO_2$ on the $CO_2$ permeation side can be more efficiently separated using the $CO_2$ partial pressure of the $CO_2$ supply side and the $CO_2$ permeation side of the $CO_2$ separation device.

$CO_2$ in the exhaust gas of a vehicle using an internal combustion engine as a power source can be more efficiently separated when the $CO_2$ separation system of the present disclosure performs the second mode in addition to the first mode.

(Third Mode)

The $CO_2$ separation system of the present disclosure (C) can further perform a third mode when the internal combustion engine is stopped. When the $CO_2$ separation system of the present disclosure performs the third mode, the $CO_2$ separation system further comprises a second $CO_2$ separation device comprising a $CO_2$ permeable membrane separating a $CO_2$ supply side and a $CO_2$ permeation side, a second $CO_2$ supply side introduction flow path for introducing air from outside the vehicle to the $CO_2$ supply side of the second $CO_2$ separation device, and a second decompression device for decompressing the $CO_2$ permeation side of the second $CO_2$ separation device.

In the third mode, air from outside the vehicle is introduced to the $CO_2$ supply side of the second $CO_2$ separation device via the second $CO_2$ supply side introduction flow path, and the $CO_2$ permeation side of the second $CO_2$ separation device is decompressed by the second decompression device, whereby $CO_2$ in the air selectively permeates from the $CO_2$ supply side to the $CO_2$ permeation side of the second $CO_2$ separation device through the $CO_2$ permeable membrane of the second $CO_2$ separation device using a difference in $CO_2$ partial pressure between the $CO_2$ supply side and the $CO_2$ permeation side of the second $CO_2$ separation device as a drive force.

Figure 3:
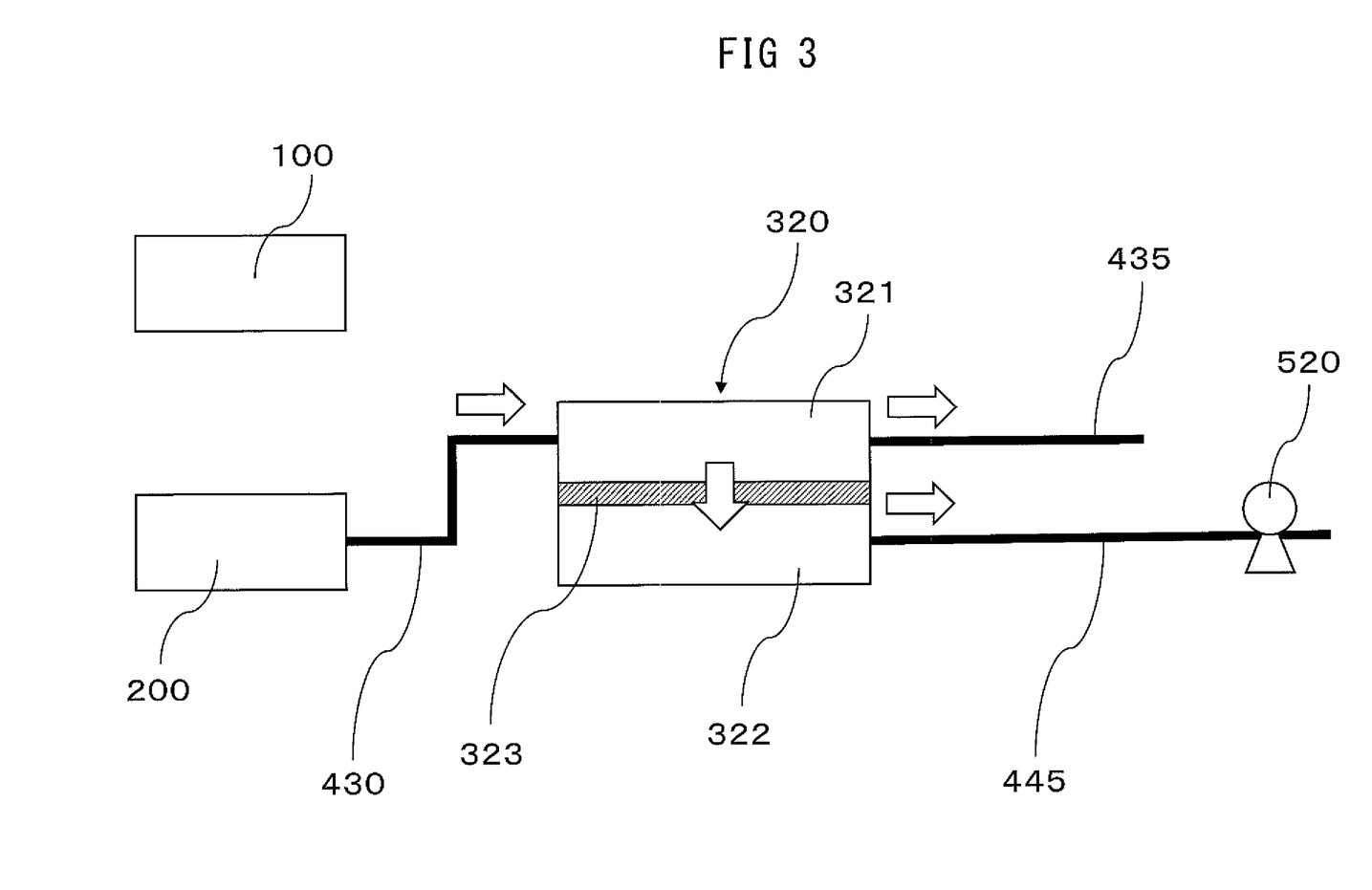
FIG. 3 is a schematic view of an example of a portion of the $CO_2$ separation system of the present disclosure performing a third mode.

FIG. 3 is a schematic view of an example of a portion of the $CO_2$ separation system of the present disclosure performing the third mode. Though not explicitly shown in FIG. 3, the internal combustion engine is stopped. The vehicle may be travelling or may be stopped.

In FIG. 3, air introduced from outside 200 of the vehicle is introduced to the $CO_2$ supply side 321 of the second $CO_2$ separation device 320 via the second $CO_2$ supply side introduction flow path 430, as indicated by the arrow. Furthermore, the $CO_2$ permeation side 322 of the second $CO_2$ separation device 320 is decompressed by the second decompression device 520. As a result, a difference in $CO_2$ partial pressure is generated between the $CO_2$ supply side 321 and the $CO_2$ permeation side 322.

Using this difference in partial pressure as a driving force, $CO_2$ in the air permeates from the $CO_2$ supply side 321 to the $CO_2$ permeation side 322 via the $CO_2$ permeable membrane 323.

Since the $CO_2$ permeation side 322 is decompressed by the second decompression device 520 arranged in the second $CO_2$ permeation side discharge flow path 445, $CO_2$ permeated from the $CO_2$ permeation side 322 is efficiently discharged to the outside of the second $CO_2$ separation device 320 via the first $CO_2$ permeation side discharge flow path 445, as indicated by the arrow. Furthermore, the remaining components of the air introduced to the $CO_2$ supply side 321 are discharged to the outside of the second $CO_2$ separation device 320 via the second $CO_2$ supply side discharge flow path 435, as indicated by the arrow.

Furthermore, FIG. 3 is not intended to limit the $CO_2$ separation system of the present disclosure to an aspect including a second $CO_2$ supply side discharge flow path 435 and a second $CO_2$ permeation side discharge flow path 445. Furthermore, FIG. 3 is not intended to limit the $CO_2$ separation system of the present disclosure to an aspect in which the power for discharging the $CO_2$ to the outside of the second $CO_2$ separation device 320 is imparted by the second decompression device 520.

Thus, in the third mode, $CO_2$ can be more efficiently separated on the $CO_2$ permeation side using the $CO_2$ partial pressure between the $CO_2$ supply side and $CO_2$ permeation side of the $CO_2$ separation device.

Furthermore, when the $CO_2$ separation system of the present disclosure performs the third mode in addition to the first mode, not only $CO_2$ in the exhaust gas of a vehicle using an internal combustion engine as a power source, but also $CO_2$ in the atmosphere surrounding the roadway can be separated.

<Vehicle>

The vehicle in which the $CO_2$ separation system of the present disclosure is installed is a vehicle using an internal combustion engine as a power source. The vehicle in which the $CO_2$ separation system of the present disclosure in installed may be a hybrid vehicle further comprising an electric motor, wherein at least one of the internal combustion engine and the electric motor is switched on and used as a power source.

In the case where the $CO_2$ separation system of the present disclosure is installed in such a hybrid vehicle, when the internal combustion engine of the vehicle is stopped and the vehicle is travelling using the electric motor, the third mode can be performed, whereby $CO_2$ in the atmosphere surrounding the roadway can be more efficiently separated. In this case, the difference in $CO_2$ partial pressure between the $CO_2$ supply side and the $CO_2$ permeation side of the second $CO_2$ separation device can be a result of Bernoulli's theorem by lowering the static pressure of the $CO_2$ on the $CO_2$ permeation side by the traveling wind, in addition to, or in place thereof to the decompression of the $CO_2$ permeation side of the second $CO_2$ separation device by the second decompression device.

<$CO_2$ Separation Device>

The $CO_2$ separation system of the present disclosure includes a first $CO_2$ separation device. The first $CO_2$ separation device includes a $CO_2$ permeable membrane separating a $CO_2$ supply side and a $CO_2$ permeation side.

The $CO_2$ permeable membrane included in the first $CO_2$ separation device is not particularly limited as long as $CO_2$ from exhaust gas can selectively permeate therethrough. In the first and second modes, from the viewpoint of using the $CO_2$ permeable membrane to separate $CO_2$ from the exhaust gas, the $CO_2$ permeable membrane is preferably a zeolite membrane, a silica membrane, or the like. These permeable membranes are preferable due to their high mechanical durability.

Furthermore, when the $CO_2$ separation system of the present disclosure performs the third mode, the $CO_2$ separation system of the present disclosure comprises a second $CO_2$ separation device. The second $CO_2$ separation device includes a $CO_2$ permeable membrane for separating a $CO_2$ supply side and a $CO_2$ permeable side.

The $CO_2$ permeable membrane included in the second $CO_2$ separation device is not particularly limited as long as $CO_2$ in air can selectively permeate therethrough. In the third mode, from the viewpoint of using the $CO_2$ permeable membrane for separating $CO_2$ from air, it is preferable to use a permeable membrane which can separate with high efficiency even when the partial pressure difference is relatively small, such as a polymer membrane, as the $CO_2$ permeable membrane.

In the case in which the $CO_2$ separation system of the present disclosure performs the first through third modes, the first $CO_2$ separation device used in the first mode and the second mode and the second $CO_2$ separation device used in the third mode can be separate devices or can be the same device. In this case, a $CO_2$ permeable membrane through which $CO_2$ in air and exhaust gas can permeate is used as the $CO_2$ permeable membrane included in the $CO_2$ separation device.

When the first $CO_2$ separation device used in the first mode and the second mode and the second $CO_2$ separation device used in the third mode are separate devices, a $CO_2$ permeable membrane suitable for the permeation of $CO_2$ in exhaust gas can be used in the first $CO_2$ separation device used in the first mode and the second mode and a $CO_2$ permeable membrane suitable for the permeation of $CO_2$ in air can be used in the second $CO_2$ separation device used in the third mode. Thus, the $CO_2$ permeable membrane used for the permeation of $CO_2$ can be switched in accordance with the mode, and $CO_2$ separation can be efficiently performed.

Furthermore, when the first $CO_2$ separation device used in the first mode and the second mode and the second $CO_2$ separation device used in the third mode are the same device, the space necessary for installation of the $CO_2$ separation system of the present disclosure can be reduced, and it is possible to save space in the vehicle in which the $CO_2$ separation system of the present disclosure is installed.

<Flow Path>

The $CO_2$ separation system of the present disclosure includes a first $CO_2$ supply side introduction flow path for introducing exhaust gas generated by the internal combustion engine to the $CO_2$ supply side of the first $CO_2$ separation device and a first $CO_2$ permeation side introduction flow path for introducing air from outside of the vehicle to the $CO_2$ permeation side of the first $CO_2$ separation device.

The shape of the first $CO_2$ supply side introduction flow path is not particularly limited as long as exhaust gas generated by the internal combustion engine can be introduced to the $CO_2$ supply side of the first $CO_2$ separation device thereby. The first $CO_2$ supply side introduction flow path can have, for example, a pipe-like shape connecting the internal combustion engine and the $CO_2$ supply side of the first $CO_2$ separation device.

The shape of the first $CO_2$ permeation side introduction flow path is not particularly limited as long as air from outside of the vehicle can be introduced to the $CO_2$ permeation side of the first $CO_2$ separation device thereby. The first $CO_2$ permeation side introduction flow path can have, for example, a pipe-like shape connecting the outside of the vehicle and the $CO_2$ permeation side of the first $CO_2$ separation device.

In the $CO_2$ separation system of the present disclosure, if the system performs the third mode, the $CO_2$ separation system includes a second $CO_2$ supply side introduction flow path for introducing air from outside of the vehicle to the $CO_2$ supply side of the second $CO_2$ separation device.

The shape of the second $CO_2$ supply side introduction flow path is not particularly limited as long as air from outside of the vehicle can be introduced to the $CO_2$ supply side of the second $CO_2$ separation device thereby. The second $CO_2$ supply side introduction flow path can have, for example, a pipe-like shape connecting the outside of the vehicle and the $CO_2$ supply side of the second $CO_2$ separation device.

When the first $CO_2$ separation device used in the first mode and the second mode and the second $CO_2$ separation device used in the third mode are the same device, the first $CO_2$ supply side introduction flow path and the second $CO_2$ supply side introduction flow path may be the same flow path.

When the first $CO_2$ supply side introduction flow path and the second $CO_2$ supply side introduction flow path are the same flow path, the $CO_2$ supply side introduction flow path can have, for example, a branched pipe-like structure on the side opposite the $CO_2$ separation device side. The branched piping may have a configuration wherein one of the branched pipes connects the internal combustion engine with the $CO_2$ separation devices and the other pipe connects the outside of the vehicle with the $CO_2$ separation devices.

Further, the branched piping may have a configuration wherein a switching device such as valve is provided in the pipe that connects the outside of the vehicle with the $CO_2$ separation device, whereby the gas to be introduced to the $CO_2$ supply side of the $CO_2$ separation device can be switched in accordance with the mode.

<Decompression Device>

In the $CO_2$ separation system of the present disclosure, when the second and third modes are performed, the $CO_2$ separation system includes first and second decompression devices. Any known decompression device can be used. For example, a decompression pump can be used as the decompression device.

When the second and third modes are performed, the decompression devices are used to decompress the $CO_2$ permeation sides of the $CO_2$ separation devices. Furthermore, the decompression devices can be used as the power source for discharging $CO_2$ which has permeated to the $CO_2$ permeation side to the outside of the $CO_2$ separation device.

The first decompression device and the second decompression device may be the same device or may be separate devices.

CONFIGURATION EXAMPLES

The $CO_2$ separation device of the present disclosure may have, for example, the configurations shown below. Note that these configurations do not limit the aspects of the $CO_2$ separation system of the present disclosure.

Configuration Example 1

Figure 4:
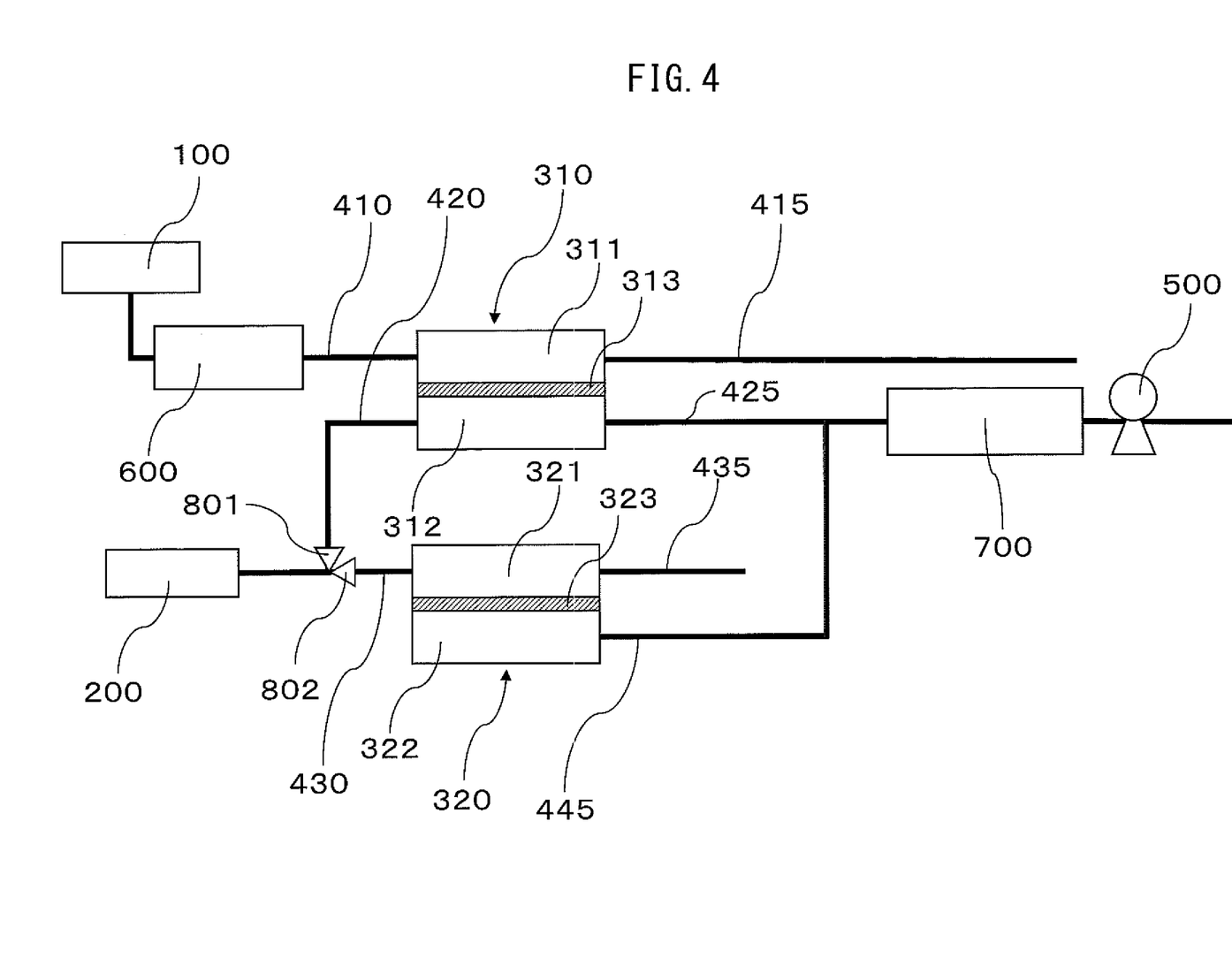
FIG. 4 is a schematic view of another example of the $CO_2$ separation system of the present disclosure, which can perform the first mode, the second mode, and the third mode.

FIG. 4 is a schematic view of another example of the $CO_2$ separation system of the present disclosure, which can perform the first mode, the second mode, and the third mode.

In FIG. 4, the $CO_2$ separation system comprises an internal combustion engine 100, a first $CO_2$ separation device 310, a first $CO_2$ supply side introduction flow path 410, a first $CO_2$ permeation side introduction flow path 420, a second $CO_2$ separation device 320, a second $CO_2$ supply side introduction flow path 430, and a decompression device 500.

The first $CO_2$ separation device 310 comprises a $CO_2$ permeable membrane 313 for separating the $CO_2$ supply side 311 and the $CO_2$ permeation side 312. Furthermore, the second $CO_2$ separation device 320 comprises a $CO_2$ permeable membrane 323 which separates the $CO_2$ supply side 321 and the $CO_2$ permeation side 322.

The first $CO_2$ supply side introduction flow path 410 connects the internal combustion engine 100 and the $CO_2$ supply side 311 of the first $CO_2$ separation device 310. Furthermore, the first $CO_2$ permeation side introduction flow path 420 connects the outside 200 of the vehicle and the $CO_2$ permeation side 312 of the first $CO_2$ separation device 310. Moreover, the second $CO_2$ supply side introduction flow path 430 connects the outside 200 of the vehicle and the $CO_2$ supply side 321 of the second $CO_2$ separation device 320.

In FIG. 4, the $CO_2$ separation system is further provided, in the first $CO_2$ permeation side introduction flow path 420 on the side opposite the first $CO_2$ separation device 310 side, with a valve 801 which can adjust the amount of air introduced from the outside 200 of the vehicle. Furthermore, a valve 802 which can adjust the amount of air introduced from outside 200 of the vehicle is provided in the second $CO_2$ supply side introduction flow path 430 on the side opposite the second $CO_2$ separation device 320 side.

Furthermore, in FIG. 4, the $CO_2$ separation system further comprises a catalytic device for exhaust gas purification 600, a first $CO_2$ supply side discharge flow path 415, a first $CO_2$ permeation side discharge flow path 425, a second $CO_2$ supply side discharge flow path 435, a second $CO_2$ permeation side discharge flow path 445, and a $CO_2$ storage device 700.

In the $CO_2$ separation system of FIG. 4, when the first mode is performed, the $CO_2$ separation system of the present disclosure functions as follows.

After the exhaust gas generated by the internal combustion engine 100 has passed through the catalytic device for exhaust gas purification 600, the exhaust gas is introduced to the $CO_2$ supply side 311 of the first $CO_2$ separation device 310 via the first $CO_2$ supply side introduction flow path 410. Furthermore, the valve 801 is opened, air from outside 200 of the vehicle is drawn into the vehicle by, for example, travelling wind, and the air is supplied to the $CO_2$ permeation side 312 of the first $CO_2$ separation device 310 via the first $CO_2$ permeation side introduction flow path 420.

As a result, exhaust gas is introduced to the $CO_2$ supply side 311 of the first $CO_2$ separation device 310 and air is introduced to the $CO_2$ permeation side 312, whereby a $CO_2$ partial pressure is generated between the $CO_2$ supply side 311 and the $CO_2$ permeation side 312 of the first $CO_2$ separation device 310.

Using this difference in partial pressure as a driving force, $CO_2$ in the exhaust gas permeates from the $CO_2$ supply side 311 to the $CO_2$ permeation side 312 via the $CO_2$ permeable membrane 313.

The $CO_2$ which has permeated to the $CO_2$ permeation side 312 is discharged to the outside of the first $CO_2$ separation device 310 along with air via the first $CO_2$ permeation side discharge flow path 425 and is stored in the $CO_2$ storage device 700.

When the second mode is performed by using the system described FIG. 4, the $CO_2$ separation system of the present disclosure functions as follows.

After the exhaust gas generated by the internal combustion engine 100 has passed through the catalytic device for exhaust gas purification 600, the exhaust gas is introduced to the $CO_2$ supply side 311 of the first separation device 310 via the first $CO_2$ supply side introduction flow path 410. At this time, the valve 801 is closed.

The $CO_2$ permeation side 312 of the first $CO_2$ separation device 310 is decompressed by the decompression device 500. As a result, a $CO_2$ partial pressure is generated between the $CO_2$ supply side 311 and the $CO_2$ permeation side 312 of the first $CO_2$ separation device.

Using this difference in partial pressure as a driving force, $CO_2$ in the exhaust gas permeates to the $CO_2$ permeation side 312 from the $CO_2$ supply side 311 via the $CO_2$ permeable membrane 313.

The $CO_2$ which has permeated to the $CO_2$ permeation side 312 is discharged to the outside of the first $CO_2$ separation device 310 along with air via the first $CO_2$ permeation side discharge flow path 425 and is stored in the $CO_2$ storage device 700.

When the third mode is performed by using the $CO_2$ separation system of FIG. 4, the $CO_2$ separation system of the present disclosure functions as follows.

The valve 802 provided in the second $CO_2$ supply side introduction flow path 430 on the side opposite the second $CO_2$ separation device 320 is opened, whereby air is introduced from the outside 200 of the vehicles to the $CO_2$ supply side 321 of the second $CO_2$ separation device 320 via the second supply side introduction flow path 430. Furthermore, the $CO_2$ permeation side 322 of the second $CO_2$ separation device 320 is decompressed by the decompression device 500.

As a result, a difference in $CO_2$ partial pressure is generated between the $CO_2$ supply side 321 and the $CO_2$ permeation side 322 of the second $CO_2$ separation device 320. Using this difference in partial pressure as a driving force, $CO_2$ in the air permeates from the $CO_2$ supply side 321 to the $CO_2$ permeation side 322 via the $CO_2$ permeable membrane 323. The $CO_2$ which has permeated to the $CO_2$ permeation side 322 is discharged to the outside of the second $CO_2$ separation device via the second $CO_2$ permeation side discharge flow path 445 and is stored in the $CO_2$ storage device 700.

Configuration Example 2

Figure 5:
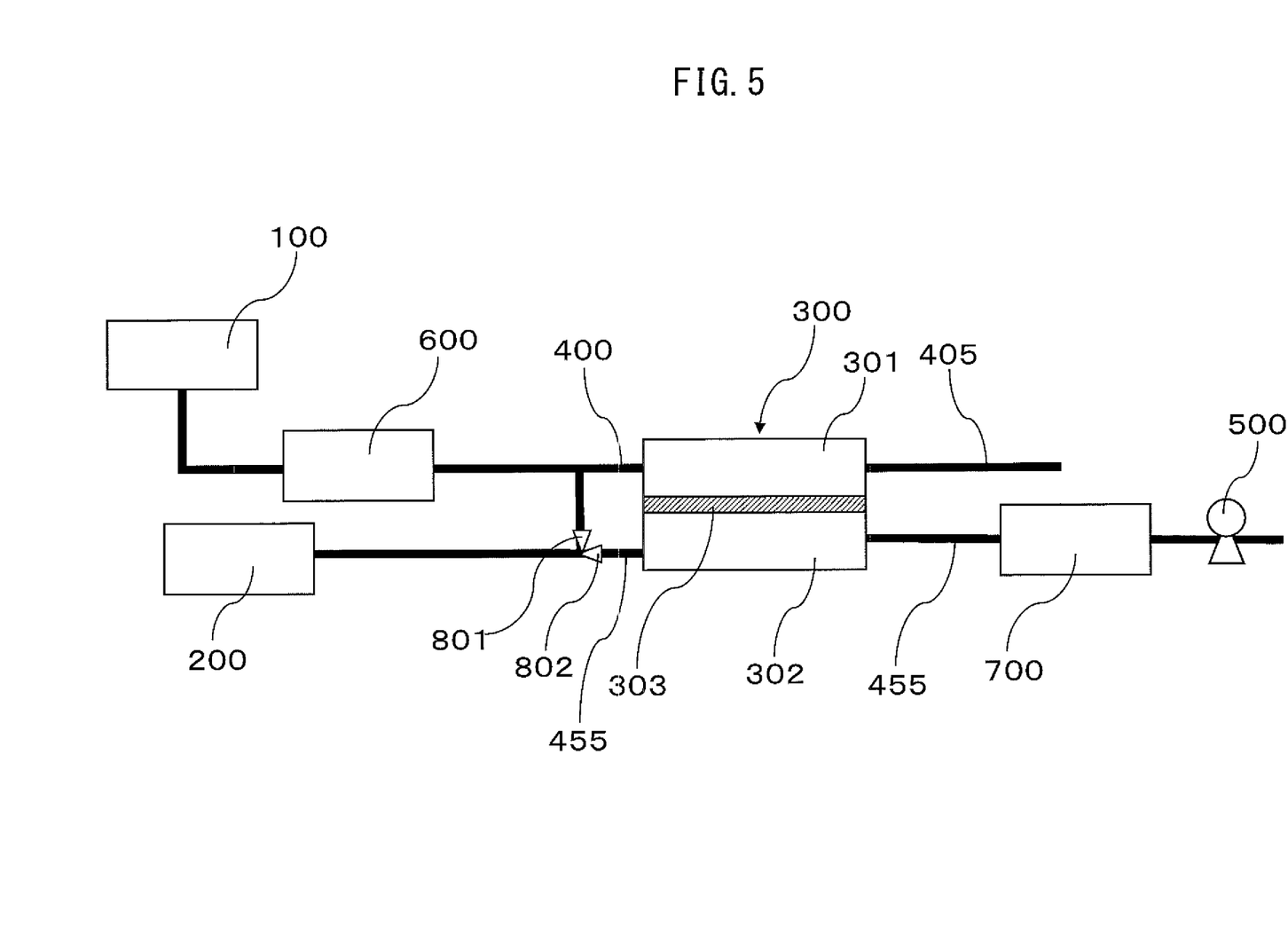
FIG. 5 is a schematic view of yet another example of the $CO_2$ separation system of the present disclosure, which can perform the first mode, the second mode, and the third mode.

FIG. 5 is a schematic view of another example of the $CO_2$ separation system of the present disclosure, which can perform the first mode, the second mode, and the third mode.

The $CO_2$ separation system of FIG. 5 has a configuration wherein the first $CO_2$ separation device and the second $CO_2$ separation device are the same device, the first $CO_2$ supply side introduction flow path and the second $CO_2$ supply side introduction flow path are the same flow path, and the first decompression device and the second decompression device are the same device.

In FIG. 5, the $CO_2$ separation system comprises an internal combustion engine 100, a first $CO_2$ separation device 310, a first $CO_2$ supply side introduction flow path 410, a first $CO_2$ permeation side introduction flow path 420, and a decompression device 500.

The first $CO_2$ separation device 310 comprises a $CO_2$ permeable membrane 323 which separates the $CO_2$ supply side 311 and the $CO_2$ permeation side 312. The first $CO_2$ supply side introduction flow path 410 connects the internal combustion engine 100 with the $CO_2$ supply side 311 of the first $CO_2$ separation device 310 and connects the outside 200 of the vehicle with the $CO_2$ supply side 311 of the first $CO_2$ separation device 310. Furthermore, the first $CO_2$ permeation side introduction flow path 420 connects the outside 200 of the vehicle with the $CO_2$ permeation side 312 of the first $CO_2$ separation device 310.

Further, the valve 801 and the valve 802 are provided in the first $CO_2$ supply side introduction flow path 410 on the side of the outside 200 of the vehicle and the first $CO_2$ permeation side introduction flow path 420 on the side of the outside 200 of the vehicle, respectively. By opening and closing these two valves, the introduction of air from outside 200 of the vehicle can be switched between the $CO_2$ supply side 311 and the $CO_2$ permeation side 312 of the first $CO_2$ separation device 310.

Furthermore, in FIG. 5, the $CO_2$ separation system further comprises a catalytic device for exhaust gas purification 600, a first $CO_2$ supply side discharge flow path 415, a first $CO_2$ permeation side discharge flow path 425, and a $CO_2$ storage device 700. A decompression device 500 is provided in the first $CO_2$ permeation side discharge flow path 425 on the side opposite the first $CO_2$ separation device 310.

Like the $CO_2$ separation system of FIG. 4, the $CO_2$ separation system of FIG. 5 can perform the first mode, the second mode, and the third mode by opening and closing the valves depending on whether the internal combustion engine is operating or stopped and whether or not the vehicle is travelling.

REFERENCE SIGNS LIST 100 internal combustion engine
200 outside of the vehicle 310 first $CO_2$ separation device
311 $CO_2$ supply side
312 $CO_2$ permeation side
313 $CO_2$ permeable membrane
320 second $CO_2$ separation device
321 $CO_2$ supply side
322 $CO_2$ permeation side
323 $CO_2$ permeable membrane
410 first $CO_2$ supply side introduction flow path
415 first $CO_2$ supply side discharge flow path
420 first $CO_2$ permeation side introduction flow path
425 first $CO_2$ permeation side discharge flow path
430 second $CO_2$ supply side introduction flow path
435 second $CO_2$ supply side discharge flow path
445 second $CO_2$ permeation side discharge flow path
500 decompression device
510 first decompression device
520 second decompression device
600 catalytic device for exhaust gas purification
700 $CO_2$ storage device
801 valve
802 valve

The invention claimed is:

1. A $CO_2$ separation method using a system for installation in a vehicle using an internal combustion engine as a power source, the system comprising the internal combustion engine, a first $CO_2$ separation device comprising a $CO_2$ permeable membrane separating a $CO_2$ supply side and a $CO_2$ permeation side, a first $CO_2$ supply side introduction flow path for introducing exhaust gas generated by the internal combustion engine to the $CO_2$ supply side of the first $CO_2$ separation device, a first $CO_2$ permeation side introduction flow path for introducing air from outside the vehicle to the $CO_2$ permeation side of the first $CO_2$ separation device, and a first decompression pump for decompressing the $CO_2$ permeation side of the first $CO_2$ separation device, the method comprising performing:

(A) when the internal combustion engine is operating and the vehicle is travelling, a first mode wherein exhaust gas generated by the internal combustion engine is introduced to the $CO_2$ supply side of the first $CO_2$ separation device via the first $CO_2$ supply side introduction flow path, and air from outside the vehicle is introduced to the $CO_2$ permeation side of the first $CO_2$ separation device via the first $CO_2$ permeation side introduction flow path using travelling wind, whereby $CO_2$ in the exhaust gas selectively permeates from the $CO_2$ supply side to the $CO_2$ permeation side of the first $CO_2$ separation device through the $CO_2$ permeable membrane of the first $CO_2$ separation device, using a first difference in $CO_2$ partial pressure between the $CO_2$ supply side and the $CO_2$ permeation side of the first $CO_2$ separation device as a first driving force, and (B) when the internal combustion engine is operating and the vehicle is stopped, a second mode wherein exhaust gas generated by the internal combustion engine is introduced to the $CO_2$ supply side of the first $CO_2$ separation device via the first $CO_2$ supply side introduction flow path and the $CO_2$ permeation side of the first $CO_2$ separation device is decompressed by the first decompression pump, whereby $CO_2$ in the exhaust gas selectively permeates from the $CO_2$ supply side to the $CO_2$ permeation side of the first $CO_2$ separation device through the $CO_2$ permeable membrane of the first $CO_2$ separation device, using a second difference in $CO_2$ partial pressure between the $CO_2$ supply side and the $CO_2$ permeation side of the first $CO_2$ separation device as a second driving force.

2. The method according to claim 1, wherein the system further comprises a second $CO_2$ separation device comprising a $CO_2$ permeable membrane for separating a $CO_2$ supply side and a $CO_2$ permeation side, a second $CO_2$ supply side introduction flow path for introducing air from outside the vehicle to the $CO_2$ supply side of the second $CO_2$ separation device, and a second decompression pump for decompressing the $CO_2$ permeation side of the second $CO_2$ separation device, and the method further comprises performing (C) when the internal combustion engine is stopped, a third mode wherein air from outside the vehicle is introduced to the $CO_2$ supply side of the second $CO_2$ separation device via the second $CO_2$ supply side introduction flow path, and the $CO_2$ permeation side of the second $CO_2$ separation device is decompressed by the second decompression pump, whereby $CO_2$ in the air selectively permeates from the $CO_2$ supply side to the $CO_2$ permeation side of the second $CO_2$ separation device through the $CO_2$ permeable membrane of the second $CO_2$ separation device using a third difference in $CO_2$ partial pressure between the $CO_2$ supply side and the $CO_2$ permeation side of the second $CO_2$ separation device as a third drive force.

3. The method according to claim 2, wherein the first $CO_2$ separation device and the second $CO_2$ separation device are the same device, the first $CO_2$ supply side introduction flow path and the second $CO_2$ supply side introduction flow path are the same flow path, and the first decompression pump and the second decompression pump are the same pump.

4. The method according to claim 1, wherein the vehicle is a hybrid vehicle further comprising an electric motor, wherein at least one of the internal combustion engine and the electric motor is switched on and used as a power source.

* * * * *